Patented Dec. 9, 1941

2,265,947

UNITED STATES PATENT OFFICE 2,265,947

PREPARATION OF FORMYL-SUBSTITUTED ESTERS

Donald J. Loder, William F. Gresham, and Donald B. Killian, Wilmington, Del., assignors to E. I. du Pont de Nemours & Company, Wilmington, Del., a corporation of Delaware No Drawing. Application February 17, 1939, Serial No. 256,854

18 Claims. (Cl. 260—483)

This invention relates to the preparation of formyl-substituted glycolic acid derivatives, and more particularly to the preparation of alkyl formyl hydroxy and alkoxy acetates. The invention relates further to the preparation of such formyl-substituted compounds by the interaction of esters of substituted and unsubstituted glycolic acids or their salts with an alkyl formate or compounds which form alkyl formates under the conditions of the reaction.

The compositions prepared by the process of the present invention are acyclic or heterocyclic formyl-substituted glycolic acid derivatives. In the acyclic compounds, the hydroxyl group may be substituted or unsubstituted by alkoxy or alkoxy alkoxy groups. Generically, the acyclic compounds have the formula,

XOCH(CHO)COOY, in which X is hydrogen or an alkyl, alkoxy, aryl, or aralkyl radical, and Y is an alkyl group, examples of which are methyl formyl glycolate,

methyl formyl methoxyl acetate,

CH₃OCH(CHO)COOCH₃;

and methyl formyl (methoxy methoxy) acetate, CH₃OCH₂OCH(CHO)COOCH₃. Methyl formyl methoxy acetate and compounds of the same class are prepared from alkyl formates and glycolic acid esters, the hydrogen of the hydroxyl group of which has been replaced by a functional group, e. g., from methoxy acetic acid esters, CH₃OCH₂COOR. Methyl (methoxy methoxy) acetate, CH₂(OCH₂OCH₃) COOCH₃, and similar compounds are prepared by the interaction of glycolic acid with dialkyl formals, in accord with the copending application of Loder et al., S. N. 256,855, filed February 17, 1939. The heterocyclic compounds of the invention are inner ether esters having the formula,

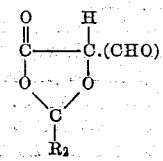

in which the R groups are two hydrogen atoms, two alkyl groups or one of each. Such compounds are prepared by reacting an aldehyde or a ketone with glycolic acid. Specific examples of these include: 5-formyl-1,3-dioxol-4-one,

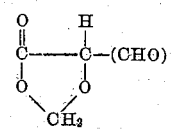

and 2-2-dimethyl-5-formyl-1-3-dioxol-4-one

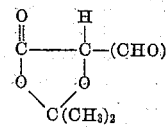

An object of the present invention is to provide a process for the preparation of formyl-substituted glycolic acid esters and their salts from alkyl formates and oxy-substituted aliphatic organic acid esters and their salts. Another object of the invention is to provide a process for the interaction of a substituted or unsubstituted alkoxy acetic acid ester with methyl formate while in the presence of carbon monoxide, an alcohol and a metal alcoholate. Yet another object of the invention is to provide a process for the preparation of methyl formyl methoxy acetate from methyl methoxy acetate, methyl formate, carbon monoxide, methanol and a suitable condensing agent. Other objects and advantages of the invention will hereinafter appear.

According to the invention, the process involves, generally, the interaction, in the presence of a catalyst, of an alkyl formate with an acyclic glycolic acid ester or an inner ether ester of glycolic acid or a salt of glycolic acid. The hydrogen of the hydroxyl group of the glycolic acid acyclic ester may, if desired, be replaced by a functional group whereupon a formyl-substituted glycolic acid ester is obtained. The reaction is preferably conducted in the presence of carbon monoxide and an alcohol. The reactions of the acyclic compounds occur in accord with the following equation:

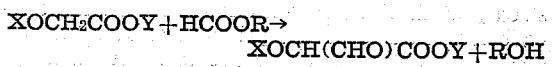

wherein X is hydrogen or an alkyl group such as methyl, ethyl, propyl, butyl, isobutyl or a higher alkyl group, or an alkoxy methylene group such as methoxy, ethoxy, propoxy, butoxy, isobutoxy methylene, and the like, or an aryl group such as benzyl, phenyl, or a carboalkoxy methoxy methylene group, etc., and Y is an alkyl group such as methyl, ethyl, propyl, butyl, isobutyl, etc., or a metal such as sodium, potassium, or other basic salt-forming metal. Specific examples of the compound represented by the formula,

XOCH₂COOY, are methyl methoxy acetate, ethyl ethoxy acetate, isobutyl isobutoxy acetate, methyl (methoxy methoxy) acetate, ethyl (ethoxy methoxy) acetate, isobutyl (isobutoxy methoxy) acetate, methyl ((carbomethoxy methoxy) methoxy) acetate, (CH₃OOCCH₂OCH₂O)CH₂COOCH₃ and the like, which will produce, respectively, methyl formyl methoxy acetate, ethyl formyl ethoxy acetate, isobutyl formyl isobutoxy acetate, methyl formyl (methoxy methoxy) acetate, ethyl formyl (ethoxy methoxy) acetate, isobutyl formyl (isobutoxy methoxy) acetate and methyl formyl ((carbomethoxy methoxy) methoxy) acetate,

CH(CHO)(OCH₂OCH₂COOCH₃)COOCH₃.

The process is also applicable to the preparation of formyl-substituted derivatives of the inner ether esters of glycolic acid which are obtained by reacting glycolic acid with ketones and aldehydes. Thus, for example, 1.3 dioxolone, obtained by known processes from glycolic acid and formaldehyde or higher aldehyde, will react with an alkyl formate in accord with the present process to give 5-formyl-1.3-dioxol-4-one, while 2.2-dialkyl-1.3-dioxol-4-one, obtained by known processes from glycolic acid and a ketone, (such as dimethyl, diethyl, dipropyl, methyl ethyl ketone and the like) will react to give 2.2-dialkyl-5-formyl-1.3-dioxol-4-one in a manner similar to the reaction of the acyclic compounds.

The reaction may be carried out at a temperature ranging between 10 and 100° C. and preferably at a temperature between 25 and 30° C. Atmospheric pressure may be used, although elevated pressures, ranging, for example, between 5 and 700 atmospheres and preferably between 100 and 300 atmospheres, are recommended.

The reaction is conducted in the presence of a catalyst such as an alkali metal alcoholate or alkaline earth metal alcoholate, preferably a sodium or potassium alcoholate; thus sodium methylate, ethylate, propylate, isobutylate or similar derivative of the other alkali metals and alkaline earth metals may be used. Usually, these alcoholates are employed dissolved in the corresponding alcohol, namely, the alcohol containing the same alkyl group as is present in the alcoholate. It has been found that when a glycolic acid ester is to be reacted at least 2 moles of the alcoholate are required, while with the glycolates in which there is a functional group in the hydrogen position of the hydroxyl group one mole of the alcoholate will usually suffice.

As has been indicated, the reaction is effected, primarily, between the glycolic acid derivative and an alkyl formate. However, it has been found that the reaction is conducted with advantage if a suitable alcohol is likewise present and carbon monoxide is introduced to give the desired pressure. As is well known, an alcohol and carbon monoxide, in the presence of alkali metal alcoholate catalysts will react to form an alkyl formate. It has been found that, when the reaction of the invention is conducted in the presence of an alcohol and carbon monoxide, exceptionally favorable results are obtainable. The reaction can even be conducted with carbon monoxide and an alcohol in the absence of an added alkyl formate. When alcoholates other than methylates are employed and the formate is an ethyl formate or a higher ester of formic acid, the corresponding alcohol should be used in order that the corresponding ester will be formed.

The more detailed practice of the invention is illustrated by the following examples in which parts given are by weight unless otherwise stated. There are, of course, many forms of the invention other than these specific embodiments.

*Example 1.*—An equimolar mixture of methyl methoxy acetate, CH₃OCH₂COOCH₃, and sodium methylate dissolved in three moles of methanol is reacted in the presence of carbon monoxide under a pressure of approximately 200 atmospheres and at a temperature between 25 and 30° C. for approximately 1 hour. A good yield of methyl formyl methoxy acetate is obtained as a viscous polymeric liquid which on heating depolymerizes and can be distilled at 50 to 55° C. at 8 mm. pressure. On standing, it repolymerizes to a very viscous material which is water white and odorless.

*Example 2.*—A reaction mixture was prepared containing 125.5 parts of methyl methoxy acetate, 62.2 parts of sodium methylate and 87.8 parts of methanol. This mixture was reacted in the presence of carbon monoxide at a temperature between 25 and 30° C. and at approximately 200 atmospheres pressure. The reaction mixture was diluted with 475.5 parts of methyl formate and the sodium precipitated as sodium methyl carbonate by the introduction of carbon dioxide at 1 atmosphere pressure. After removing the carbonate by filtration, the precipitate was washed with methyl formate to remove all of the formyl derivative. Methyl formate was then separated from the methyl formyl methoxy acetate by distillation at 1 atmosphere. The methyl formyl methoxy acetate, which is obtained in 97% yield (based on the methyl methoxy acetate used) is a resinous-like material.

*Example 3.*—A reaction mixture was prepared containing 61.7 parts of methyl (methoxy methoxy) acetate, 46.5 parts of methanol, and 26.2 parts of sodium methylate. Carbon monoxide was introduced into the reaction mixture until a pressure of approximately 200 atmospheres was obtained. The reaction proceeded at approximately 30° C. for approximately 1 hour. The carbon monoxide pressure was then released and the reaction product was found to consist of the sodium salt of methyl formyl (methoxy methoxy) acetate in methyl formate. Dry carbon dioxide gas was passed into the mixture at atmospheric pressure, sodium methyl carbonate was precipitated and filtered off. The filtrate consisted of a solution of methyl formyl (methoxy methoxy) acetate in methyl formate. The methyl formate was distilled off at reduced pressure and low temperature and the methyl formyl (methoxy methoxy) acetate, a resinous-like compound, was recovered in a good yield.

*Example 4.*—Methanol-free sodium methylate (54 parts) was added slowly, with stirring, to a mixture consisting of 104 parts of methyl methoxy acetate and 600 parts of methyl formate which was cooled to between 0 and 10° C. The reaction mixture was held at this temperature for approximately 12 hours, carbon monoxide was then added to give a pressure of approximately 200 atmospheres and the reaction allowed to proceed at substantially room temperature. Methyl formyl methoxy acetate was obtained in good yield.

*Example 5.*—A reaction mixture was prepared by adding 67.5 parts of methyl glycolate and 45.0 parts of methyl formate to a solution containing 34.5 parts of sodium in 256 parts of methanol. The reaction mixture was processed under 600 atmospheres pressure of carbon monoxide at 35° C. until absorption was complete. Methyl formyl glycolate, a resinous-like material, was isolated in 72% yield (based on the methyl glycolate used), by employing the method described in Example 2. The alkyl formyl hydroxy and alkoxy acetates are useful as solvents for oxygenated organic compounds generally and as intermediates in organic synthesis.

From a consideration of the above specification it will be appreciated that many changes may be made in the details therein given without departing from the scope of the invention or sacrificing any of its advantages.

We claim:

1. A process for the preparation of formyl glycolic acid compounds which comprises reacting a compound selected from the group consisting of alkyl formates and compounds which, under the conditions of the reaction form alkyl formates with a compound of the group consisting of glycolic acid lower alkyl esters, inner lower alkyl ether esters of glycolic acid, and glycolic acid lower alkyl esters in which the hydrogen of the hydroxyl group has been substituted by a radical selected from the group consisting of hydrogen, alkyl, alkoxy methylene, and aryl radicals.

2. The process of claim 1 conducted at a temperature between 10 and 100° C.

3. The process of claim 1 conducted at a pressure between 5 and 700 atmospheres.

4. The process of claim 1 conducted in the presence of a metal alcoholate.

5. The process of claim 1 conducted in the presence of an alcohol, carbon monoxide, and a metal alcoholate.

6. A process for the preparation of formyl alkoxy acetic acid esters which comprises interacting an alkoxy acetic acid ester with an alkyl formate in the presence of carbon monoxide and a metal alcoholate.

7. A process for the preparation of formyl-substituted alkoxy acetic acid esters which comprises interacting an alkoxy acetic acid ester with an alkyl formate utilizing a catalyst selected from the group consisting of alkali metal and alkaline earth metal alcoholates dissolved in an alcohol.

8. A process for the preparation of methyl formyl methoxy acetate which comprises reacting methyl methoxy acetate with methyl formate in the presence of sodium methylate dissolved in methanol and under carbon monoxide pressure.

9. A process for the preparation of an alkyl formyl (alkoxy methoxy) acetate which comprises reacting an alkyl (alkoxy methoxy) acetate with an alkyl formate.

10. The process of claim 9 conducted under carbon monoxide pressure.

11. The process of claim 9 conducted under carbon monoxide pressure and in the presence of an alkali metal alcoholate dissolved in an alcohol as the condensing agent.

12. The process of claim 9 conducted at a temperature between 25 and 30° C. and at a pressure of approximately 200 atmospheres.

13. A process for the preparation of formyl-substituted alkoxy acetic acid lower alkyl esters which comprises interacting, in the presence of an alkali metal alcoholate, an alkyl formate, an alcohol and carbon monoxide with a glycolic acid lower alkyl ester, in which the hydrogen of the hydroxyl group has been substituted by a functional group.

14. A process for the preparation of methyl formyl methoxy acetate which comprises forming a substantially equimolar mixture of methyl methoxy acetate of methyl formate and subsequently effecting reaction of the mixture at a temperature of approximately 30° C. and under a carbon monoxide pressure of substantially 200 atmospheres.

15. A process for the preparation of methyl formyl (methoxy methoxy) acetate which comprises forming a substantially equimolar mixture of methyl (methoxy methoxy) acetate and methyl formate and subsequently effecting reaction of the mixture at a temperature of approximately 30° C. and under a carbon monoxide pressure of substantially 200 atmospheres.

16. Methyl formyl methoxy acetate.

17. Methyl formyl (methoxy methoxy) acetate.

18. Methyl formyl glycolate.

DONALD B. KILLIAN.
WILLIAM F. GRESHAM.
DONALD J. LODER.